(No Model.)
R. N. DYER.
ELECTRIC METER.
No. 371,559.  Patented Oct. 18, 1887.
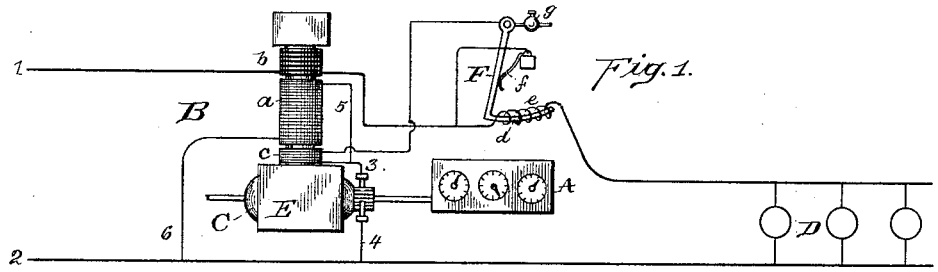
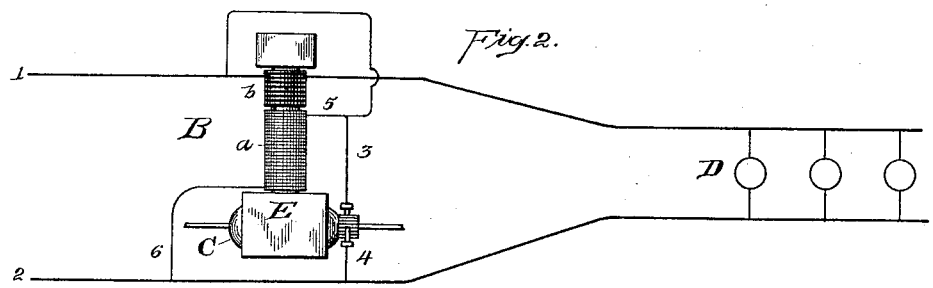
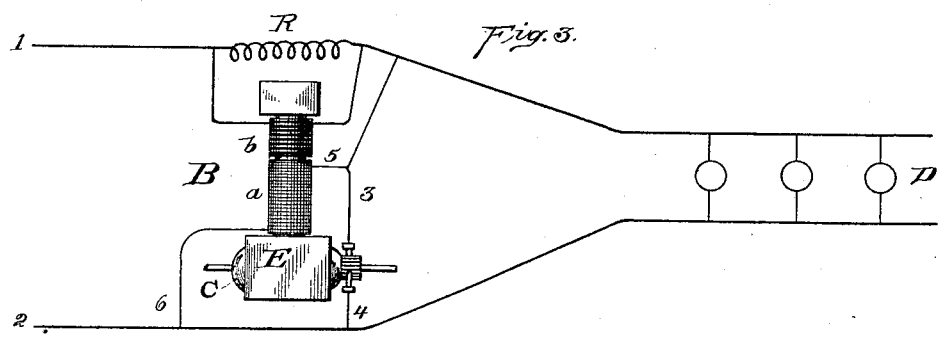
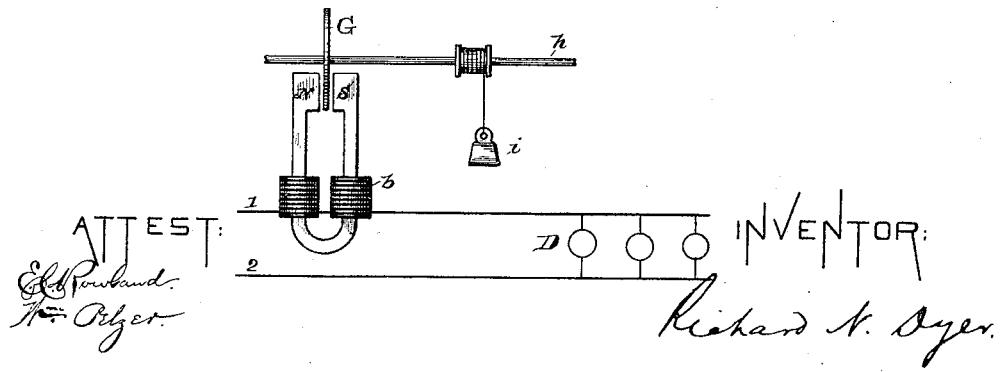
ATTEST:  INVENTOR:
Richard N. Dyer.

UNITED STATES PATENT OFFICE.

RICHARD N. DYER, OF EAST ORANGE, NEW JERSEY.

ELECTRIC METER.

SPECIFICATION forming part of Letters Patent No. 371,559, dated October 18, 1887.

Application filed October 21, 1886. Serial No. 216,857. (No model.)

*To all whom it may concern:*

Be it known that I, RICHARD N. DYER, of East Orange, in the county of Essex and State of New Jersey, have invented a certain new and useful Improvement in Electric Meters, of which the following is a specification.

The object I have in view is to produce a simple and accurate registering electric meter.

My invention consists, first, in employing demagnetizing-coils in the main line, acting to increase in proportion to the current the speed of the register-driving motor by decreasing the force of a speed controlling magnet; second, in combining such demagnetizing-coils with an electric motor in such manner that the force of its field-magnet will be decreased by the demagnetizing-coils in proportion to the current; third, in arranging such an electric motor so acted on by the demagnetizing-coils with its field-magnet and armature in cross-circuit; fourth, in arranging such an electric motor so acted on by the demagnetizing-coils with its field-magnet and armature in independent cross-circuits; fifth, in providing such an electric motor so acted on by the demagnetizing-coils and having its field-magnet and armature in independent cross-circuits with auxiliary field coils in series with the armature; and, sixth, in the combination, with register-driving electric motor and the demagnetizing-coils, of a circuit-controller for the motor-circuits operated or caused to operate by the main-line current, all as more fully hereinafter explained.

In the accompanying drawings, forming a part hereof, Figure 1 is a view, principally in diagram, of the preferred arrangement; Fig. 2, a similar view showing a modified arrangement of the motor-circuits, the circuit-controller and register being omitted; Fig. 3, a similar view showing a modified arrangement of the demagnetizing-coils, and Fig. 4 a view of a simple form of meter embodying the main feature of the invention.

With reference more particularly to Figs. 1, 2, and 3, A is a suitable register, counter, or indicator. This device is one of well-known mechanical construction, and, as will be understood, may be made to register the speed, which is what is desired for a recording-meter; or it may be made to only indicate the speed, which is a desirable form for a current-indicator. In the preferred form of my meter the motor for driving the register is an electro-dynamic motor, B. This is provided with an armature, C, located in a cross-circuit, 3 4, between the positive and negative conductors 1 2 of the circuit the current of which is to be measured. This circuit 1 2 supplies incandescent electric lamps D or other translating devices. The field-magnet E of the electric motor has a high-resistance winding, *a*, which is located in a cross-circuit, 5 6, independent of the armature-circuit 3 4. The winding *a* is the principal winding of the field-magnet, and produces the predominating magnetism. The field-magnet is also provided with low-resistance demagnetizing-coils *b*, which are located directly in the line of the conductor 1 or 2 for a house-meter, Figs. 1 and 2; but for a station-meter or for measuring a very large current in any location the demagnetizing-coils wills be arranged in a shunt around a resistance, R, in the line, Fig. 3.

The demagnetizing-coils act to decrease the force of the field-magnet E in proportion to the line current, and the motor-armature, which is controlled by this magnet, increases its speed as the force of the field-magnet is decreased by the demagnetizing-coils. I design to proportion the parts and resistances so that the armature will revolve with the smallest speed possible with an economical construction when the minimum current is flowing in the line, the field-magnet then having the greatest strength. I propose to work well within the saturation-point of the field-magnet, in order that the rise and fall of the magnetism may be proportional to the current. When one lamp is in circuit, the register will be driven slowly by the motor; but as more lamps are placed in circuit the speed of the motor will increase in proportion to the increased flow of the current. The register will thus give an accurate statement of the flow of current, either directly or by deducting the number of revolutions due to the initial speed of the motor. The motor-armature and field being in cross-circuit, a constant driving force is obtained, assuming that a constant difference in potential is maintained, and the demagnetizing-coils are the only variable factor of the apparatus. The location of the field-magnet and armature in independent cross-circuits takes care largely of variations in potential, since such variations affect the field-magnet and armature oppositely and approximately to the same extent when there is no load, as with my arrangement. An increase in potential acts on the armature to increase its speed, while the effect of an increase in potential on the field-magnet is to increase its strength and decrease the speed of the armature, and hence the speed of the armature will remain the same. This simple arrangement of the field-magnet and the armature in independent cross-circuits, which is shown in Figs. 2 and 3, will be sufficient to maintain a practically-constant speed under the ordinary variations of potential. I may deem it advisable, however, to employ an auxiliary field-magnet winding, $c$, Fig. 1, which is located in series with the armature, and, preferably, also in series with the main field-winding $a$, the latter bearing a shunt relation to the armature. This winding $c$ will assist the main winding $a$ and keep the speed of the motor constant under all variations in potential, except as such variations act to increase the line-current, when of course the motor responds to the action of the demagnetizing-coils. The cross-circuits 3 4 and 5 6 may be connected with the circuit 1 2 between the demagnetizing-coils and the lamps, Figs. 1 and 3, or outside of such demagnetizing coils, Fig. 2.

To prevent waste of current when no lamps are in circuit, when such is desirable, I provide a circuit-controller, which acts to close the motor-circuits when the first lamp is placed in circuit, and retains such motor-circuits closed until the last lamp is turned off, when the circuit-controller will open the motor-circuits. This circuit-controller may be any suitable device operated or caused to operate by the line-current. A swinging lever, F, of brass, may be used, provided with a soft-iron core, $d$, on its lower end, acted on by a main-line coil, $e$. The lever F touches a spring, $f$, and closes the motor circuit when the core $d$ is drawn into the coil $e$. An adjustable weight, $g$, throws the lever F away from the spring $f$ and opens the motor-circuits when current ceases to flow in the coil $e$. This circuit-controller, or a device for the same purpose, will preferably be used with each meter having an electric motor for driving the register when such motor has a speed proportional to the number of lamps in circuit; but when the motor has an initial speed, which is necessarily deducted from the register-reading to give the revolutions due to the lamp-current, then this circuit-controller is not required. A conventional form of electric motor is shown for simplicity in illustration; but any form of electro-dynamic motor may be employed. The field-magnet windings are shown, for simplicity, as bobbins occupying different parts of the magnet-cores; but it is evident that they may be wound one over the other.

A simple illustration of the main feature of the invention is afforded by the construction shown in Fig. 4. The register-driving shaft $h$ carries a copper disk, G, which revolves between the poles N S of a permanent magnet. A spring, weight, or electric or other form of motor, exerting a constant force, turns the shaft $h$. This motor is represented by the weight $i$, hung by a cord from a drum on the shaft. The demagnetizing-coils $b$ are placed upon the permanent magnet and act to decrease its force. The permanent magnet retards the movement of the disk G, and the coils $b$ serve to decrease the force of the magnet and to accelerate the speed of the disk and the register in proportion to the current flowing in the circuit 1 2.

What I claim is—

1. In an electric meter employing a driven register, the combination, with a magnet controlling the speed of the register, of demagnetizing-coils in the main line acting to decrease the force of the said magnet and to increase the speed of the register, substantially as set forth.

2. In an electric meter, the combination, with a register and an electric motor driving the same, of demagnetizing-coils in the main line acting to decrease the force of the field-magnet of the motor, substantially as set forth.

3. In an electric meter, the combination, with a register, of an electric motor having its armature and field-magnet in cross-circuit and demagnetizing-coils in the main line acting to decrease the force of the field-magnet of the motor, substantially as set forth.

4. In an electric meter, the combination, with a register, of an electric motor having its armature and field-magnet in independent cross-circuits and demagnetizing-coils in the main line acting to decrease the force of the field-magnet of the motor, substantially as set forth.

5. In an electric meter, the combination, with a register, of an electric motor having its armature and main field-coils in independent cross-circuits, auxiliary field-coils in series with the armature, and demagnetizing-coils in the main line acting to decrease the force of the field-magnet of the motor, substantially as set forth.

6. In an electric meter, the combination, with the register-driving electric motor, its operating-circuit, and the demagnetizing-coils, of a circuit-controller for the motor-operating circuit operated or caused to operate by the main-line current, substantially as set forth.

This specification signed and witnessed this 19th day of October, 1886.

RICHARD N. DYER.

Witnesses:
WM. PELZER,
E. C. ROWLAND.